Jan. 1, 1946.  C. D. WILSON  2,392,209
POSITION INDICATOR
Original Filed July 19, 1940
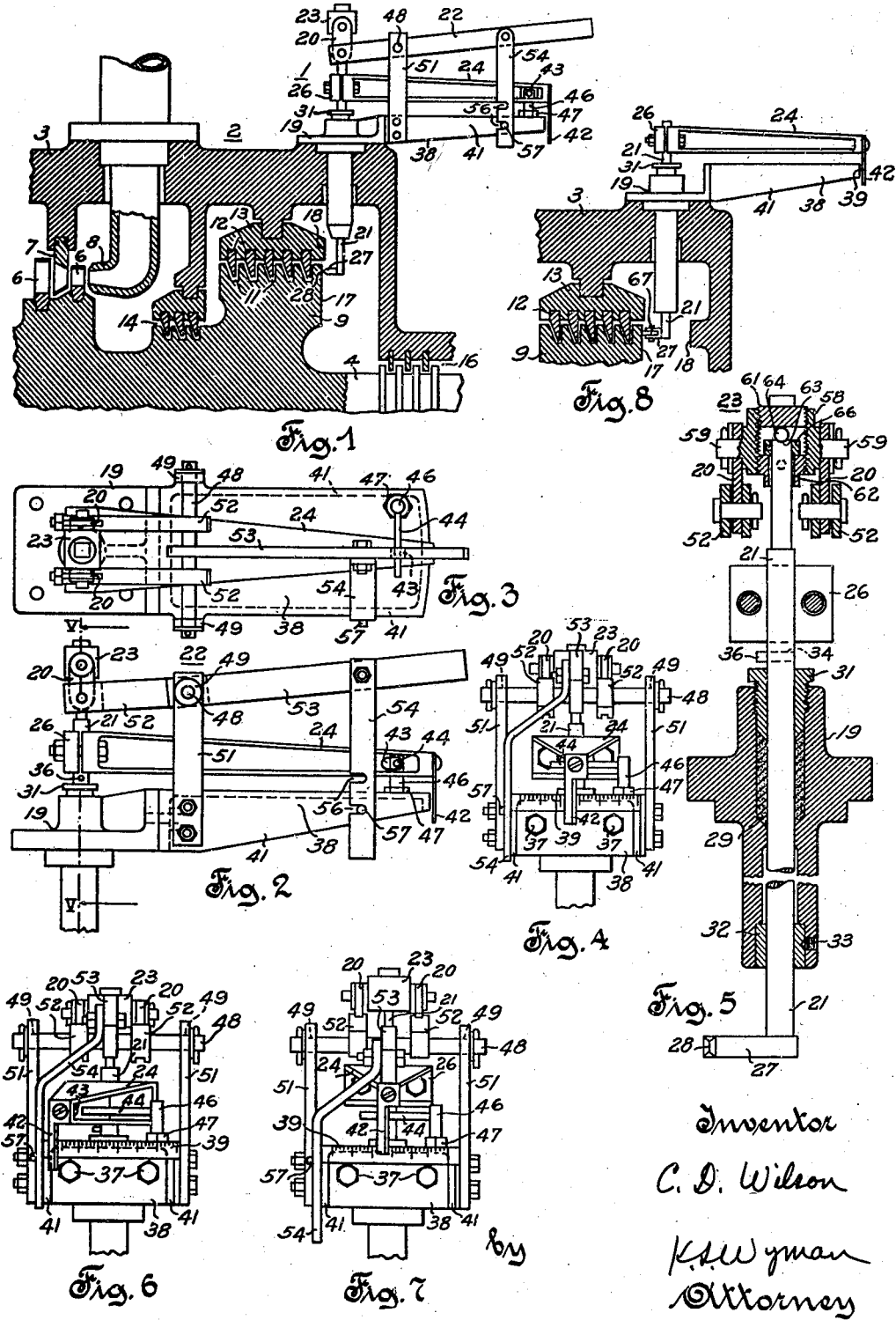

Patented Jan. 1, 1946

2,392,209

UNITED STATES PATENT OFFICE 2,392,209

POSITION INDICATOR

Charles D. Wilson, West Allis, Wis., assignor to Allis-Chalmers Manufacturing Company, Milwaukee, Wis., a corporation of Delaware Continuation of application Serial No. 346,388, July 19, 1940. This application March 13, 1943, Serial No. 479,079

3 Claims. (Cl. 33—172)

This application is a continuation of my copending application Serial No. 346,388, filed July 19, 1940, and the invention disclosed herein relates generally to position indicators and more particularly to the type of indicator which is especially adapted to accurately measure the relative axial position or displacement of a rotor with respect to the associated stator or casing.

The efficiency of a turbine decreases with increased axial clearances between the stationary and moving blades and the usual practice is to construct large turbines so as to permit a slight axial adjustment of the spindle or rotor with respect to the stator in order to obtain the best possible efficiency during operation under varying conditions of temperature and pressure. This construction necessitates the use of a position or clearance indicating means which is capable of accurately indicating the relative position of the spindle or rotor with respect to the stator. A common procedure in this connection is to employ an axially movable rod or shaft which is provided with an axial micrometer adjustment, with an eccentrically disposed end portion, and with a means for turning the rod about its longitudinal axis in order to successively position the eccentrically disposed end of the rod in opposed relation with respect to plane reference surfaces on the spindle and stator and to effect an actual engagement of the eccentrically disposed end portion with the reference surfaces by effecting an axial movement of the rod. Another and somewhat similar procedure, which has also been used extensively, is to employ a rod positioned to extend parallel to the spindle axis which is provided with a plunger and a spring biasing means arranged to urge the end of the rod into engagement with a plane and radially extending surface on the adjacent end of the spindle. A multiplying lever indicates the relative position of the spindle with respect to the casing and the end of the rod may be withdrawn from engagement with the spindle by the operator and held in its withdrawn position by means of coacting retaining surfaces.

These commonly used procedures have not proven entirely satisfactory, as the axially movable position indicating rod must of necessity be positioned adjacent the end of the turbine spindle or rotor and as a result the relative displacement between the rotor and stator is determined at a point at which the temperature is relatively low. Consequently, the actual clearance between the moving and stationary parts in the hottest portion of the turbine cannot be determined by the known types of apparatus previously mentioned. Furthermore, when the known types of apparatus are used in connection with modern high pressure turbines, for example, topping turbines in which the steam pressure adjacent the discharge end may be as much as 600 lbs. per square inch, the force exerted on the end of the rod by the pressure of the steam renders an axial movement of the rod and a determination of the degree of contact between the end of the rod and the opposed surfaces on the spindle or stator extremely difficult, if not impossible and the results thus obtained highly inaccurate.

It is therefore an object of this invention to provide an improved position indicating means which will facilitate the determination of the relative position or displacement of one member with respect to another and which will entirely eliminate the aforementioned defects.

Another object of this invention is to provide an improved position indicating means which can be operatively positioned adjacent radially spaced or between axially spaced moving and stationary parts in any part of the machine thereby permitting an accurate determination of the clearance between stationary and moving parts in the highly heated portion or portions of the machine.

Still another object of this invention is to provide an improved position indicating means in that the relative position of two associated members is readily and accurately indicated or measured by the angular movements of a rod about its longitudinal axis.

A further object of this invention is to provide an improved position indicating means in that the relative position of two associated members having radially spaced reference surfaces can be readily and accurately measured by means of an axially movable rod having thereon a transversely extending portion which is alternatively positioned opposite the reference surfaces on said members by an axial movement of said rod and which is brought into contact with said surfaces by effecting an angular movement of said rod about its longitudinal axis.

The invention accordingly consists of the various features of construction, combinations of elements, and arrangements of parts as more particularly set forth in the appended claims and in the detailed description, in which:

Fig. 1 is a partial sectional view of the high pressure end of a turbine embodying the invention.

Fig. 2 is an enlarged side elevation of that portion of the indicating device shown in Fig. 1 which is outside of the turbine casing;

Fig. 3 is a plan view of the device shown in Fig. 2;

Fig. 4 is a view of the right-hand end of the device shown in Fig. 2;

Fig. 5 is a sectional view taken on line V—V of Fig. 2;

Fig. 6 is a view similar to Fig. 4 showing the position to which the indicating arm must be moved before an axial adjustment of the measuring device can be effected;

Fig. 7 is another view similar to Fig. 4 showing the position to which the indicating arm is moved after the axial adjustment of the measuring device has been effected; and Fig. 8 is a view of a modified construction.

Referring to Fig. 1, it is seen that the measuring device 1 is shown, for purposes of illustration, as applied to a turbine 2 having a casing or stator 3 and a spindle or rotor 4. The spindle and casing are provided with coacting moving and stationary blades 6 and 7, respectively, to which a working fluid is supplied through a nozzle structure 8. The spindle is also provided with a dummy piston structure or cylinder 9 having therein a plurality of annular sealing grooves 11 which coact with complementary sealing projections 12 on a stationary block 13 mounted on the interior of the casing 3 so as to form therewith a labyrinth seal. The spindle and casing are also provided with coacting portions on either side of the dummy piston structure 9 which form the additional labyrinth sealing structures 14 and 16 disposed in axially spaced relation with respect to one another and with respect to the dummy piston structure 9. The side of the dummy piston structure 9 which is adjacent the sealing structure 16 and the corresponding side of the stationary block 13 present radially spaced reference surfaces 17 and 18, respectively. The surface 17 is made annular so as to permit measurements to be taken and the relative position of the rotor and stator determined while the turbine is operating.

The measuring device 1 comprises, as best shown in Figs. 2-5, inclusive, a combined supporting and bearing structure 19, a rod or shaft member 21 which is mounted in the structure 19 for axial and for angular movements with respect to its longitudinal axis, a lever 22 and a pair of links 20 operatively connecting the lever 22 with the connector 23 which in turn is connected with the rod member 21 for effecting axial movements of the member 21 in response to movements of the lever 22, and a laterally extending arm 24 which is rigidly secured to the rod member 21 by means of the clamping structure 26 and which serves for effecting angular movements of the rod member 21. The end of the rod member 21 opposite that to which is attached the connector 23 is provided with a laterally extending portion or projection 27 having thereon a contacting portion or surface 28 adapted for engagement with the reference surfaces 17 and 18 on the rotor and stator, respectively. In other words, the reference surfaces 17 and 18 need not lie in the same plane, and all that is necessary in this respect is that the transversely extending part or portion 27 be of greater radial length as measured from the axis of rod 21 than is the distance between the side of the rod 21 and the farthest removed of said surfaces. The outer end of the bore in the supporting structure 19 through which the rod member 21 extends is counterbored to provide the packing space 29 and is internally threaded to receive a packing nut 31. The inner end of the bore in the supporting structure 19 through which the rod member 21 extends is also counterbored to receive an annular bearing member 32 which is held in place by a set screw 33. The rod member 21 immediately above the supporting structure 19 is provided with a transverse bore 34 into which is partially inserted a laterally-extending pin 36 adapted to engage the packing nut 31 and thereby limit the inward axial movement of the rod member 21.

The supporting structure 19 has removably secured thereto, as by means of the bolts 37, a laterally extending rigid member 38 which is generally rectangular in shape when viewed in plan as shown in Fig. 3. The outer free end or edge of the member 38 is of arcuate shape as shown in Fig. 3 and is provided with a scale 39, as shown in Figs. 4, 6 and 7. The transverse cross sectional configuration of the member 38 which has depending side flanges 41 is of inverted U-shape form, as clearly indicated by Figs. 4, 6 and 7. The arm 24, which is secured to the rod member 21 and which is approximately coextensive in length with the member 38 extends adjacent and in overlying relation with respect to the member 38. The free end of the arm 24 is provided with a pointer 42 which is disposed in indicating relation with respect to the scale 39 on the member 38 and with a transversely extending opening 43 adapted to receive the laterally extending arm 44 on the locking member 46 which in this illustration is rigidly secured to the top surface of the member 38 by any suitable means such as the clamping nut 47.

The lever 22 comprises, as best seen in Figs. 3, 4, 6 and 7, a pivot pin 48 having its ends rotatably mounted in alined bearings 49 formed in the pair of upstanding and oppositely disposed bars 51 which are bolted to the side flanges 41 of the member 38 adjacent its point of connection to the supporting structure 19, a pair of laterally spaced, parallel arms 52 secured to and extending transversely from the pivot pin 48 and having their free ends pivotally with the pair of links 20 which in turn are pivotally connected to the opposite sides of the connector 23, and an oppositely extending arm 53 which is secured to and extends transversely from the portion of the pivot pin 48 intermediate the arms 52. This arrangement provides in effect a lever having an operating handle portion 53 and a bifurcated end portion 52 which is pivotally connected with the links 20. The handle portion 53 of the lever 22 is provided intermediate its point of pivotal connection with the bars 51 and its free end with a depending pivotally connected link 54, having, as seen in Figs. 4, 6 and 7, a laterally offset lower portion having in one edge thereof a pair of longitudinally spaced notches 56 adapted to receive the pin 57 on the adjacent side flange 41 of the member 38. The arrangement is such that when the rod 21 is positioned with its measuring projection 27 opposite the reference surface 17 on the rotor 4, the pin 57 enters the lower notch 56 in the link 54 and that when the projection 27 is disposed opposite the reference surface 18 on the stator block 13, the pin 57 enters the upper notch 56 in the link 54. The link 54 is disengaged from the pin 57 by the operator moving the link angularly in a counterclockwise direction, as seen in Figs. 1 and 2, and reengagement is effected either by the operator or by gravity action when the link is subsequently released. However, if preferred, a positive biasing means of any desired type may be employed.

The connector 23 comprises, as best seen in Fig. 5, a hollow, open-ended and internally threaded block member 58 having opposite laterally extending exterior projections 59 to which the links 20 are pivotally connected, a threaded plug member 61 closing its outer end, and a threaded annular, plug member 62 through which the rod 21 is adapted to pass, closing its inner end. The outer end surface of the rod 21 is provided with a slight recess 63 of spherical form adapted to provide a seat for the spherical ball 64. The outer end portion of the rod 21 is externally threaded and has secured thereto an internally threaded annular collar member 66 adapted to engage the adjacent surface of the annular plug member 62. The rod 21 and the connector 23 are assembled by placing the annular plug member 62 on the rod 21, then securing the annular collar 66 on the end of the rod, then inserting the end of the rod into the interior of the hollow block member 58 and screwing the annular plug member 62 in place, then placing the ball 64 in the seat 63 on the end of the rod 41, and then screwing in place the plug member 61. This construction provides a positive and a substantially frictionless connection between the rod 21 and the connector 23 which permits a slight degree of angular movement between the said rod and connector since the internal diameter of the annular plug member 62 is greater than the diameter of the rod 21 as shown.

The position indicator shown is partially assembled in the selected part of a separable stator structure of usual construction (not shown) before the stator structure is assembled by boring the selected part to receive the supporting structure 19, by inserting the rod 21 through the bore from the interior side of said part, by sliding the said supporting structure 19 on the outer end of said rod and into said bore, by securing the supporting structure 19 to the stator part, and by inserting the pin 36 in the rod 21 so as to retain the rod in the approximate position, as shown in Fig. 1 with respect to the supporting structure 19. The remaining portions of the position indicator are preferably assembled in the obvious manner after the stator structure has been completely assembled. However, if desired, the external diameter of the supporting structure may be made such that the rod 21 can be inserted through the bore from outside the stator structure in which event the position indicator can be entirely assembled after the turbine is otherwise ready for operation.

The relative position of the spindle or rotor with respect to the stator is readily determined by the operator, assuming the various parts are in the position shown in Figs. 1-4, inclusive, by moving the indicator arm 24, if necessary, so as to set the pointer 42 on the scale 39 in the zero or base position, then moving the indicator arm 24 in a counterclockwise direction as viewed in Fig. 4 until the contacting portion 28 of the projection 27 engages the reference surface 17 and reading the position of the pointer 42 on the scale 39, then moving the indicator arm 24 in a clockwise direction, which moves the projection on the rod 21 away from the reference surface 17, until the end of the arm 24 is free of the locking projection 44 as shown in Fig. 6, then moving the link 54 in a counterclockwise direction as viewed in Figs. 1 and 2, thereby disengaging the link 54 from the pin 57, then moving the adjacent end of the lever 22 downward until the pin 57 engages the upper notch 56 in the link 57 which movement of the lever 22 effects through the links 20 and the connector 23 on outward axial movement of the rod sufficient to bring the projection 27 opposite the reference surface 18 on the stator block 13, then moving the indicator arm 24 in a counterclockwise direction, as viewed in Fig. 7, until the pointer is again in its zero or base position, as shown in Fig. 7, and then continue moving the indicator arm 24 in the counterclockwise direction until the contact portion 28 of the projection 27 engages the reference surface 18 and again reading the position of the pointer 42 on the scale 39. The difference between the two readings just mentioned accurately measures with respect to the zero or base position selected, the angular movement of the indicator arm 24 and rod 21 which is necessary to engage the contact portion 28 on the projection 27 or rod 21 with the reference surfaces 17 and 18 on the turbine rotor and stator, respectively. Consequently, the above mentioned procedure accurately determines the position of the rotor with respect to the stator at the time the readings are taken.

The actual measurement of the relative position of two objects is effected solely by angular movements of the rod 21 and consequently the degree of pressure within the chamber or compartment in which the reference surfaces are located and into which the coacting end portion of the rod 21 extends in no manner effects the determination of the degree of contact between the rod and the said reference surfaces. Moreover, the indicator arm 24 can be readily made of sufficient length without rendering the device cumbersome or unwieldy to effect the requisite degree of multiplication which is necessary for obtaining extremely accurate readings of the slight angular movements of the rod 21. Furthermore, since the rod 21, the projection 27 and contacting portion 28, and the arm 24 are in effect an integral structure, the indicating device is entirely free from multiplying lever arrangements and the like which are always conducive to some degree of lost motion and inaccurate results.

Referring to Fig. 8 in which like numerals are used to designate the same or similar parts, it is seen that this modification differs from that shown in Figs. 1-7, inclusive, in that the plane parallel reference surfaces 17 and 18 on the rotor and stator, respectively, are oppositely disposed instead of being radially spaced as shown in Fig. 1; in that the lateral projection on the rod 21 is provided with a contacting roller 67 instead of the contacting portion 28; and in that the rod 21 is mounted only for angular movements about its longitudinal axis and that therefore the connector 23, the links 20, the lever 22, the notched link 56, the pin 57, the opening 43, and the locking structure 44, 46 are omitted.

Measurements may be taken with this modified construction simply by moving the indicator arm 24 so as to set the pointer 42 to its zero position midway between the ends of the scale 39, then moving the arm 24 from said midposition in a clockwise direction until the roller 67 engages the reference surface 18 and reading on the scale 39 the distance the pointer 42 has been moved from its zero position, then moving the arm 24 in a counterclockwise direction until the roller 67 engages the reference surface 17 and again reading on the scale 39 the distance the pointer 42 has been moved from its zero position. The difference between these two readings is, as previously stated, in connection with the description of Figs. 1–7, inclusive, an accurate measurement of the relative position of the rotor 4 and the stator 3. In this connection, it may be well to point out that while in this modified construction the rod 21 and the indicating arm 24 are frictionally held in the supporting and bearing structure 19 against accidental turning movement, it may be desirable in some applications to provide a positive latch means to perform this function.

The modified construction illustrated in Fig. 8 provides all of the advantages previously pointed out in connection with Figs. 1–7, inclusive, and while it may be preferred for particular applications, generally speaking, it is not quite as satisfactory due to the fact that the roller may not wear uniformly which would introduce inaccuracies when the wear becomes appreciable, unless the same part of the roller always engages both of the reference surfaces.

Both forms of the apparatus are herein shown and described by way of application as applied to an end portion of a turbine in which the temperature is relatively high and the pressure is relatively low, but it should be understood that measuring apparatus embodying this invention can be readily positioned in operative relation adjacent to radially spaced or between axially spaced moving and stationary parts in the highly heated and high pressure portions of the machine and readings readily taken without in any manner effecting the accuracy of the results thus obtained. The invention is applicable for measuring or determining the relative positions of any two coacting objects of general application, and while the invention is illustrated in connection with the high pressure end of a turbine, it should be further understood that it is not desired to limit the invention to the exact mode of operation and to exact details of construction herein shown and described as various modifications within the scope of the appended claims may occur to persons skilled in the art.

It is claimed and desired to secure by Letters Patent:

1. An indicator for measuring the relative axial position of a rotating member with respect to a coacting stationary member presenting a reference surface which is radially spaced from a reference surface on said rotating member comprising a rod having thereon a laterally extending part, means supporting said rod for longitudinal movement adjacent said reference surfaces and for angular movement about its longitudinal axis, means including a lever for effecting a longitudinal movement of said rod and for locking said rod in either of two positions, in one of which said part is positioned opposite the reference surface on said rotating member and in the other of which said part is positioned opposite the reference surface on said stationary member, said part being of greater radial length as measured from the longitudinal axis of said rod than the distance between the side of said rod and the farthest removed of said reference surfaces, and means operative when said rod is in either of said two positions to effect a sufficient angular movement of said rod to engage said part with the oppositely disposed one of said reference surfaces.

2. An indicator for measuring the relative axial position of a rotating member with respect to a coacting stationary member presenting a reference surface which is radially spaced from a reference surface on said rotating member comprising a rod having thereon a laterally extending part, means supporting said rod for longitudinal movement adjacent said reference surfaces and for angular movement about its longitudinal axis, means including a lever for effecting a longitudinal movement of said rod and for locking said rod in either of two positions, in one of which said part is positioned opposite the reference surface on said rotating member and in the other of which said part is positioned opposite the reference surface on said stationary member, said part being of greater radial length as measured from the longitudinal axis of said rod than the distance between the side of said rod and the farthest removed of said reference surfaces, means operative to prevent longitudinal movement of said rod from either one of said two positions to the other when said part engages or is disposed in proximity with respect to the oppositely disposed one of said reference surfaces, and means operative when said rod is in either of said two positions to effect a sufficient angular movement of said rod to engage said part with the oppositely disposed one of said reference surfaces.

3. An indicator for measuring the relative axial position of a rotating member with respect to a coacting stationary member presenting a reference surface which is radially spaced from a reference surface on said rotating member comprising a rod having thereon a laterally extending part, means supporting said rod for longitudinal movement adjacent said reference surfaces and for angular movement about its longitudinal axis, means for effecting a longitudinal movement of said rod to alternatively position said part opposite the said reference surfaces, said part being of greater radial length as measured from the longitudinal axis of said rod than the distance between the side of said rod and the farthest removed of said reference surfaces, means operative to prevent a longitudinal movement of said rod when said part engages or is disposed in proximity with respect to either of said reference surfaces, and means for effecting a sufficient angular movement of said rod to engage said part with the oppositely disposed one of said reference surfaces.

CHARLES D. WILSON.